United States Patent [19]

Hofmann

[11] Patent Number: 4,620,929

[45] Date of Patent: Nov. 4, 1986

[54] PROCESS FOR THE REMOVAL OF PROTEIN AND DEGRADATION PRODUCTS THEREOF FROM WATER

[76] Inventor: Hellmut G. Hofmann, Mönchsheide 5, 5063 Overath-Eulenthal, Fed. Rep. of Germany

[21] Appl. No.: 681,320

[22] Filed: Dec. 13, 1984

[30] Foreign Application Priority Data

Aug. 11, 1984 [DE] Fed. Rep. of Germany ....... 3429691
Sep. 21, 1984 [DE] Fed. Rep. of Germany ....... 3434678

[51] Int. Cl.⁴ .............................................. C02F 3/30
[52] U.S. Cl. .................................. 210/610; 210/617; 210/630; 210/905
[58] Field of Search ................ 210/610, 611, 615–617, 210/605, 630, 903, 905, 614

[56] References Cited

U.S. PATENT DOCUMENTS

| | | | |
|---|---|---|---|
| 3,843,517 | 10/1974 | McKinney et al. | 210/611 |
| 4,018,650 | 4/1977 | Busta et al. | 210/611 X |
| 4,126,544 | 11/1978 | Baensch et al. | 210/610 |
| 4,133,752 | 1/1979 | Kurane et al. | 210/611 |
| 4,253,966 | 3/1981 | Lebesgue et al. | 210/610 |
| 4,255,266 | 3/1981 | Moreaud et al. | 210/614 |
| 4,444,664 | 4/1984 | Treyssac | 210/617 X |
| 4,469,600 | 9/1984 | Frydman et al. | 210/617 X |

Primary Examiner—Tom Wyse
Attorney, Agent, or Firm—Browdy and Neimark

[57] ABSTRACT

In a process for the removal of protein and degradation products thereof from water, a filter material which has a large contact area is flushed by the water to be purified. In order to be able also to remove, in particular, the nitrate from the water, the filter material used is an inert carrier, such as plastics material, preferably foamed plastics material, expanded clay or the like, which contains bacteriophilic nutrients, such as lactose and/or dextrose and/or phthalic acid ester or the like, and to which releases the latter slowly over a fairly long period of time, as a result of which the carrier forms an advantageous substrate for settlement by bacteria. An aerobic and an anaerobic reaction zone are set up in the filter material, so that both nitrification and denitrification can take place in the filter material.

11 Claims, 1 Drawing Figure

U.S. Patent     Nov. 4, 1986     4,620,929
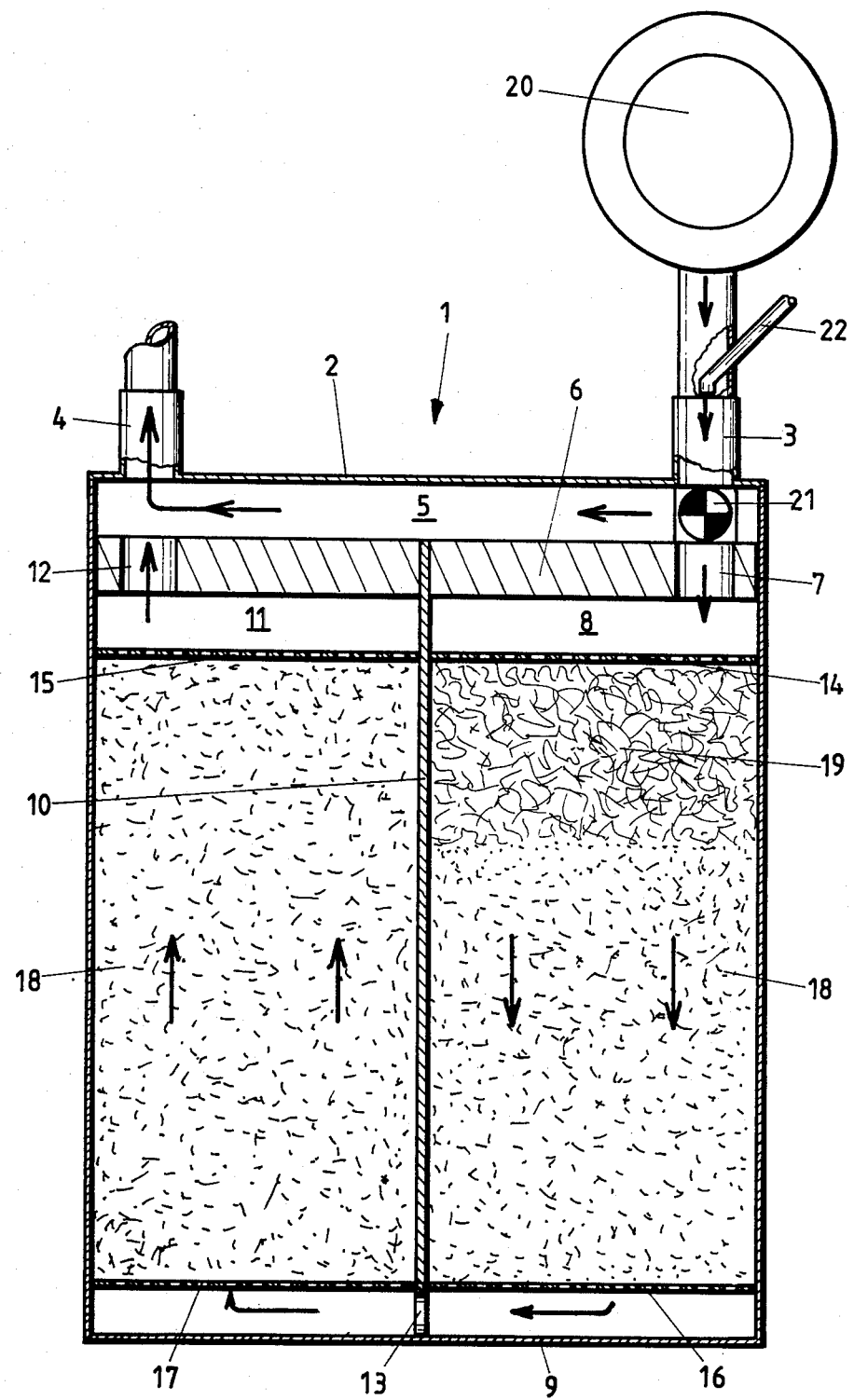

PROCESS FOR THE REMOVAL OF PROTEIN AND DEGRADATION PRODUCTS THEREOF FROM WATER

The invention relates to a process for the removal of protein and degradation products thereof from water, wherein the filter material having a large contact area is flushed by the water to be purified, and to a device for carrying out the process.

A process in which the water to be purified is passed through a filter composed of open-cell polyurethane foam is known from U.S. Pat. No. 3,957,017 In this filter, the protein degradation products ammonium and nitrites are converted into nitrates. The removal from the water of the nitrates, which are also harmful, is not possible in this known process.

The invention is based on the object of providing a method for removing all protein degradation products from the water, at low cost.

This object is achieved, in accordance with the invention, by using as the filter material an inert carrier which contains bacteriophilic nutrients and releases the latter slowly over a fairly long period of time or to which the bacteriophilic nutrients are fed from outside, and by setting up an aerobic reaction zone and an anaerobic reaction zone in the filter material.

The carrier used can be plastics material, preferably foamed plastics material, expanded clay or the like, while lactose and/or dextrose and/or compounds of phthalic acid and derivatives thereof and also compounds with phthalic acid or the like can be provided as the bacteriophilic nutrients. Phthalic acid ester is particularly suitable. However, it is equally possible also to use other bacteriophilic nutrients.

When the process according to the invention is used, the filter material equipped with the large surface area forms a substrate from which small amounts of bacteriophilic nutrients diffuse out continuously, or at which the bacteriophilic nutrients fed in from outside become lodged, so that the desired microorganisms can establish themselves on the substrate very rapidly and can multiply explosively.

Mainly so-called nitrifying bacteria (nitrate bacteria) which oxidise to nitrate the ammonia formed by the decomposition of protein, establish themselves in the aerobic zone. These chemolithotrophic organisms are primarily representatives of the genera Nitrosomonas and Nitrobacter which live together in a parasymbiontic manner, the former being nitrite-formers and the latter being nitrate-formers.

Primarily, denitrifying bacteria, for example Pseudomonas stutzeri and Micrococcus denitrificans, establish themselves in the anaerobic zone. These anaerobic bacteria utilise the oxygen liberated in the reduction of nitrates as a hydrogen acceptor for the breakdown of organic nutrients.

The formation of the aerobic and anaerobic zones is achieved by flushing the filter material by the water to be purified at a comparatively low flow rate. An aerobic zone is then first set up in the filter material, and an anaerobic zone is then set up behind this, in the direction of flow, depending on the content of oxygen remaining in the water. The flow rate through the filter can also be defined by the determination of oxygen at the filter outlet. In order that an anaerobic zone can be set up, the water must have an oxygen content of 2 ppm or less. If the values determined are higher than this, the flow rate must be reduced somewhat.

If the particle size of the filter material is selected appropriately, it is also possible to produce, on the same particle, an aerobic zone outside and an anaerobic zone inside.

If the process according to the invention is used in aquaria or fish-farming ponds, care must be taken that the returned water, which has a low oxygen content, does not cause damage. The purified water is therefore preferably returned to the aquarium or fish-farming pond by free trickling contact with air or via a diffuser, so that it can thus re-absorb the oxygen it has lost and can give up the gaseous nitrogen.

A determination of nitrate can also be carried out additionally at the filter outlet. Its value, which, especially in the case of aquaria, should be 50 ppm or less, can also be adjusted by controlling the flow rate of the water through the filter.

If the bacteriophilic nutrients are fed in from outside, this can be effected in dependence on the measured values found in the determination of oxygen and/or nitrate.

In order to make the process start quickly, it is possible to add previously used filter material to the fresh filter material before the filter is started up. Alternatively, it is also possible to inoculate the filter material, prior to the start up of the filter, with nitrifying and denitrifying bacteria which have been freeze-dried or rendered stable by other means. This enables the running-in times of the filters to be shortened considerably.

A device for carrying out the process according to the invention can be characterised in that it has at least one filter chamber which is equipped with an inlet line and an outlet line and which is at least partially filled with the filter material.

The inlet line is preferably connected directly to the outlet line via a by-pass line, an adjustable valve being provided to control the amount of water running through the filter. An arrangement of this type has the advantage that in aquaria and other fish-farming ponds the customary filter pumps, which have a relatively high performance, can be used further while only a small part stream which is required for the nitrification and denitrification of the water, is passed through the filter. The purified part stream of low oxygen content which emerges from the filter can then be combined with the stream passing through the by-pass line, so that the abstraction of oxygen is no longer of any significance.

It is expedient for an air supply line to run into the inlet line; as a result of this air supply line the water which reaches the filter and first flows through the aerobic zone has an adequate oxygen content, which is necessary for the nitrification.

A mechanical coarse filter can additionally be provided in the direction of flow upstream of the filter material, so that interference is not caused to the subsequent filter zones by the deposition of particles of impurities.

The invention is illustrated in an exemplary manner in the drawing and is described in detail below with the help of the drawing.

The drawing shows the section through a filter consisting of a container 1 which is closed on all sides. A tubular inlet line 3 is attached to the lid 2 of the container 1 on one side, and an outlet line 4 is attached on the side diametrically opposite.

The inlet line 3 intersects a by-pass line 5 which runs direct to the outlet line 4 between the container lid 2 and a partition 6. Crossing through an aperture 7 provided in the partition 6, the inlet line 3 runs into a first filter chamber 8, which extends as far as the base 9 of the container 1. The first filter chamber 8 is separated from a second filter chamber 11 by means of a vertical dividing wall 10. The second filter chamber 11 is connected via an aperture 12 to the by-pass line 5 and via the latter to the outlet line 4. Immediately above the base 9 of the container, the vertical dividing wall 10 has at least one through aperture 13, by means of which the two filter chambers 8 and 11 are connected to one another.

The two filter chambers 8 and 11 each have an upper sieve plate 14 and 15, respectively, at a distance below the partition 6, and each have a lower sieve plate 16 and 17, respectively, at a distance above the lower base 9 of the container.

Both of the filter chambers 8 and 11 are filled, between their sieve plates 14 and 16 and 15 and 17, respectively, with a filter material 18 which has a large contact area and consists of a carrier containing bacteriophilic nutrients. Additionally, there is a coarse filter padding 19, which acts as a mechanical coarse filter, in the upper zone of the first filter chamber 8, which is downstream of the inlet line 3.

On entering the filter container 1, the water to be purified, which is pumped in through the inlet line 3 by means of a circulating pump 20, passes first to an adjustable valve 21 which can split the total incoming stream into different part streams, one of which passes immediately into the first filter chamber, and the other passes to the outlet line 4 via the by-pass line 5.

A separate air supply line 22, by means of which the water to be purified entering the filter container 1 is enriched with oxygen, also runs into the inlet line 3.

It is possible to carry out a determination of oxygen and/or nitrate in the outlet zone of the filter chamber 11, for example in the neighbourhood of the through aperture 12. The oxygen content should not exceed an amount of 2 ppm, and the nitrate content should not exceed a figure of 50 ppm. If the two figures are exceeded, the flow rate through the filter must be reduced further, that is to say a greater quantity of the circulating water is passed through the by-pass line 5.

If the bacteriophilic nutrients are not present in the filter material from the outset, they must be fed in at the inlet zone 8 of the filter chamber. In addition to lactose and dextrose, suitable nutrients are compounds of phthalic acid and derivatives thereof and also compounds containing phthalic acid. Hitherto phthalic acid ester has proved very suitable, and phthalates, phthalamides, phthalazoles and alkyd resins can also be used additionally. The bacteriophilic nutrients are fed in as a solution in water or in a readily soluble form. The only important factor is that the added substances can be absorbed by the microorganisms, which can then crack the nutrients, for example by means of enzymes.

An example of the use of the filter is given below:

A filter volume sufficient to purify a 200-litre aquarium is about 0.4 litre, this volume relating to the space between the sieve plates 14 and 15, respectively, and 16 and 17, respectively. About 200 g of the filter material 18 is introduced into the whole absorption space of the two filter chambers 8 and 11, which amounts to 0.4 litre in all. This filter material consists, for example, of a foamed plastics mixture of PVC and polyethylene, and it contains phthalic acid ester. Alternatively, however, it is also possible to use expanded clay into which other bacteriophilic nutrients have been introduced. The filter material is granular and has a relatively large, rough surface. Before start up the filter material is inoculated with bacteria which have been freeze-dried or rendered stable by other means.

The circulating pump 20 has a discharge capacity of, for example, about 200 litres per hour. Since this rate of circulation would be too high for the filter, the valve 21 is adjusted so that only approx. 50 litres per hour pass through the filter, while the remaining water is passed via the by-pass line 5 straight to the outlet line 4, which returns the water to the aquarium together with the purified fraction passing through the through aperture 12. The flow through the filter should, for example, be regulated so that the water emerging from the through aperture 12 has an oxygen content of less than 1 ppm. The water returned to the aquarium should be introduced into the aquarium by free trickling in contact with air or via a diffusor, so that, firstly, the oxygen deficit is compensated for and, secondly, the nitrogen liberated from the nitrate can be released to the atmosphere.

Depending on the rate of flow of the water to be purified through the filter chambers, an aerobic zone and an anaerobic zone are set up therein. At the flow rate mentioned above, the aerobic zone will be set up in the first filter chamber 8, and the anaerobic zone will be set up in the second filter chamber 11. As the throughput rate is altered, the boundary between the aerobic and the anaerobic zone will be shifted forwards or backwards. To this extent, it is also possible to manage with a single filter chamber in which the boundary between the aerobic and the anaerobic zone is set up in the course of flow. If desired, the aerobic and anaerobic zones can also be formed directly adjacent to one another, if an appropriate particle size is selected for the filter material.

I claim:

1. A process for removing protein and degradation products thereof from water, wherein a single filter material having a large contact area is flushed by the water to be purified, wherein the filter material used is an inert carrier containing bacteriophilic nutrients comprising a member of the group consisting of phthalic acid ester and compounds with phthalic acid esters, wherein the filter material releases the nutrients slowly, and an aerobic reaction zone and an anaerobic reaction zone are automatically set up in the filter material, the aerobic reaction zone and the anaerobic reaction zone comprising a single filter bed.

2. Process according to claim 1, characterised in that the carrier used is plastics material, preferably foamed plastics material.

3. Process according to claim 1, characterised in that expanded clay is used as the carrier.

4. Process according to claim 1, characterised in that the filter material is flushed by the water to be purified at a relatively low flow rate.

5. Process according to claim 4, characterised in that the flow rate through the filter is defined by means of an oxygen determination at the filter outlet.

6. Process according to claim 4, characterised in that a determination of nitrate is carried out at the filter outlet.

7. Process according to claim 4, wherein the bacteriophilic nutrients are fed in from outside, characterised in that the amount of bacteriophilic nutrients fed in is metered in as a function of the values of oxygen and/or nitrate measured.

8. Process according to claim 1, for the purification of water from aquaria or fish-farming ponds, characterised in that the purified water is returned to the aquarium or fish-farming pond by free trickling in contact with the air or via a diffuser.

9. Process according to claim 1, characterised in that previously used filter material is added to the fresh filter material before the filter is started up.

10. Process according to claim 1, characterised in that the filter material is inoculated with freeze-dried nitrifying and denitrifying bacteria before the filter is started up.

11. The process of claim 1 wherein the bacteriophilic nutrients are fed from the outside.

* * * * *